(12) United States Patent
Vasseur et al.

(10) Patent No.: US 8,208,372 B2
(45) Date of Patent: Jun. 26, 2012

(54) TECHNIQUE FOR FAST ACTIVATION OF A SECONDARY HEAD-END NODE TE-LSP UPON FAILURE OF A PRIMARY HEAD-END NODE TE-LSP

(75) Inventors: Jean-Philippe Vasseur, Dunstable, MA (US); Warren Scott Wainner, Potomac Falls, VA (US)

(73) Assignee: Cisco Technology, Inc., San Jose, CA (US)

( * ) Notice: Subject to any disclaimer, the term of this patent is extended or adjusted under 35 U.S.C. 154(b) by 789 days.

(21) Appl. No.: 11/446,561

(22) Filed: Jun. 2, 2006

(65) Prior Publication Data

US 2007/0280102 A1 Dec. 6, 2007

(51) Int. Cl.
*G08C 15/00* (2006.01)
(52) U.S. Cl. .......................... 370/225; 370/227
(58) Field of Classification Search .................. 370/466, 370/216, 392, 419, 248, 386, 219, 225, 227; 709/223, 241; 455/445
See application file for complete search history.

(56) References Cited

U.S. PATENT DOCUMENTS

| | | | |
|---|---|---|---|
| 6,628,649 B1 | 9/2003 | Raj et al. | |
| 6,751,190 B1 | 6/2004 | Swallow | |
| 6,778,492 B2 | 8/2004 | Charny et al. | |
| 6,831,898 B1 | 12/2004 | Edsall et al. | |
| 6,850,486 B2 | 2/2005 | Saleh et al. | |
| 6,978,394 B1 | 12/2005 | Charny et al. | |
| 7,043,250 B1* | 5/2006 | DeMartino | 455/445 |
| 7,269,132 B1* | 9/2007 | Casey et al. | 370/219 |
| 7,372,870 B2* | 5/2008 | Huang et al. | 370/466 |
| 2002/0181485 A1* | 12/2002 | Cao et al. | 370/419 |
| 2003/0043792 A1* | 3/2003 | Carpini et al. | 370/386 |
| 2003/0126287 A1 | 7/2003 | Charny et al. | |
| 2003/0147352 A1* | 8/2003 | Ishibashi et al. | 370/248 |
| 2003/0189898 A1* | 10/2003 | Frick et al. | 370/227 |
| 2003/0233595 A1 | 12/2003 | Charny et al. | |
| 2004/0090913 A1 | 5/2004 | Scudder et al. | |
| 2004/0190445 A1* | 9/2004 | Dziong et al. | 370/225 |
| 2004/0196827 A1 | 10/2004 | Xu et al. | |

(Continued)

OTHER PUBLICATIONS

U.S. Appl. No. 11/334,151, entitled Dynamic Protection Against Failure of a Head-End Node of One or More TE-LSPS, by Jean-Philippe Vasseur on Jan. 18, 2006.

(Continued)

*Primary Examiner* — Kwang B Yao
*Assistant Examiner* — Syed M Bokhari
(74) *Attorney, Agent, or Firm* — Cesari and McKenna, LLP

(57) ABSTRACT

A technique dynamically activates a secondary Traffic Engineering Label Switched Path (TE-LSP) at a secondary head-end node upon failure of a primary TE-LSP in a computer network. According to the novel technique, a primary head-end node establishes the primary TE-LSP having a primary bandwidth (BW) amount to a primary tail-end node. Also, the secondary head-end node establishes the secondary TE-LSP having zero BW to a secondary tail-end node (e.g., the same as the primary tail-end node). The secondary head-end node monitors the state of the primary TE-LSP, and in response to a failure (e.g., or other state change) substantially immediately adjusts the BW of the secondary TE-LSP to the primary BW amount ("activating" the TE-LSP). A "prior-hop" node to the primary and secondary head-end nodes originally forwarding traffic to the primary head-end node, may then begin forwarding traffic to the secondary head-end node, and thus onto the adjusted secondary TE-LSP.

30 Claims, 6 Drawing Sheets

U.S. PATENT DOCUMENTS

| | | | |
|---|---|---|---|
| 2004/0205239 A1* | 10/2004 | Doshi et al. | 709/241 |
| 2005/0083928 A1 | 4/2005 | Sivabalan et al. | |
| 2005/0097219 A1 | 5/2005 | Goguen et al. | |
| 2005/0213508 A1 | 9/2005 | Gerstel | |
| 2005/0265346 A1* | 12/2005 | Ho et al. | 370/392 |
| 2005/0281192 A1 | 12/2005 | Nadeau et al. | |
| 2006/0031490 A1 | 2/2006 | Provine et al. | |
| 2006/0159009 A1* | 7/2006 | Kim et al. | 370/216 |
| 2007/0011284 A1* | 1/2007 | Le Roux et al. | 709/223 |

OTHER PUBLICATIONS

Perlman, Radia, "Interconnections Second Edition: Bridges, Routers, Switches, and Internetworking Protocols", Sections 12.2.4, Addison Wesley Longman, Inc., 2000, pp. 317-319.

"Cisco MPLS AutoBandwidth Allocator for MPLS Traffic Engineering: A Unique New Feature of Cisco IOS Software", White Paper, Cisco Systems, Inc., 2001, pp. 1-4.

Rekhter, Y. et al., RFC 1771, "A Border Gateway Protocol 4 (BGP-4)", Network Working Group, Mar. 1995, pp. 1-54.

Moy, J., RFC 2328, entitled OSPF Version 2, Apr. 1998, pp. 1-204.

Callon, R., RFC 1195, entitled Use of OSI ISIS for routing in TCP/IP and Dual Environments, Dec. 1990, pp. 1-80.

Awduche, D., RFC 3209, entitled RSVP-TE: Extensions to RSVP for LSP Tunnels, Dec. 2001, pp. 1-57.

Smit, H., RFC 3784 entitled, Intermediate-System-to-Intermediate-System (IS-IS) Extensions for Traffic Engineering (TE), Jun. 2004, pp. 1-13.

Braden, R. et al., RFC 2205, entitled Resource ReSerVation Protocol (RSVP), Version 1 Functional Specification, Sep. 1997, pp. 1-105.

Pan, P., et al., RFC 4090, entitled Fast Reroute Extensions to RSVP-TE for LSP Tunnels, May 2005, pp. 1-36.

Katz, D., Internet Draft, entitled Bidirectional Forwarding Detection (draft-ietf-bfd-base-04.txt), Oct. 2005, pp. 1-42.

Vasseur, J.P., et al., Internet Draft, entitled Path Computation Element(PCE) Communication Protocol (PCEP)—Version 1 (draft-ietf-pce-pcep-01.txt), Feb. 24, 2006, pp. 1-54.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Berger, L., RFC 3473 entitled, Generalized Multi-Protocol Label Switching (GMPLS) Signaling Resource ReSerVation Protocol-Traffic Engineering (RSVP-TE) Extensions, Jan. 2003, pp. 1-40.

* cited by examiner

TECHNIQUE FOR FAST ACTIVATION OF A SECONDARY HEAD-END NODE TE-LSP UPON FAILURE OF A PRIMARY HEAD-END NODE TE-LSP

BACKGROUND OF THE INVENTION

1. Field of the Invention

The present invention relates to computer networks and more particularly to activation of secondary Traffic Engineering Label Switched Path (TE-LSP) upon failure of a primary TE-LSP having separate head-end nodes in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

An example of an inter-domain routing protocol is the Border Gateway Protocol version 4 (BGP), which performs routing between domains (ASes) by exchanging routing and reachability information among neighboring inter-domain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build end-to-end tunnels based on a series of constraints through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. A PCC can be informed of a PCE either by pre-configuration by an administrator, or by a PCE Discovery (PCED) message ("advertisement"), which is sent from the PCE within its area or level or across the entire AS to advertise its services.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP and to convey various TE-LSP attributes to routers, such as border routers, along the TE-LSP obeying the set of required constraints whose path may have been computed by various means.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

A common practice in TE-enabled networks consists of deploying a mesh of TE-LSPs between a plurality of edge devices (provider edge, or PE routers) through a core network of fewer (generally large capacity) routers (provider, or P routers). In a mesh between PE routers (e.g., a "full mesh"), each PE router on one side of the core is connected to each PE router on the other side of the core via one or more TE-LSPs. The mesh of TE-LSPs provides various benefits within the network, as known to those skilled in the art, such as for providing redundancy to nodes connected to more than one PE router.

Occasionally, a network element (e.g., a node or link) fails, causing redirection of the traffic that originally traversed the failed network element to other network elements that bypass the failure. Generally, notice of this failure is relayed to the nodes in the same domain through an advertisement of the new network topology, e.g., an IGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, including, inter alia, Fast Reroute (FRR), e.g., MPLS TE FRR. An example of MPLS TE FRR is described in Pan, et al., *Fast Reroute Extensions to RSVP-TE for LSP Tunnels*, RFC 4090, dated May 2005, which is hereby incorporated by reference as though fully set forth herein.

FRR has been widely deployed to protect against network element failures, where "backup" or "secondary tunnels" are created and set up a priori (before the occurrence of the failure) to bypass a protected network element (e.g., links, shared risk link groups (SRLGs), and nodes). When the network element fails, traffic is quickly rerouted over a backup tunnel to bypass the failed element, or more particularly, in the case of MPLS, a set of TE-LSP(s) is quickly rerouted. Specifically, the point of local repair (PLR) configured to reroute the traffic inserts ("pushes") a new label for the backup tunnel, and the traffic is rerouted accordingly. Once the failed element is bypassed, the backup tunnel label is removed ("popped"), and the traffic is routed along the original path according to the next label (e.g., that of the original TE-LSP, or that expected by the node receiving the rerouted TE-LSP). Notably, the backup tunnel, in addition to bypassing the failed element along a protected primary TE-LSP also intersects the primary TE-LSP, i.e., it begins and ends at nodes along the protected primary TE-LSP. As such, protection of head-end nodes (and tail-end nodes) may be difficult to accomplish.

One example, however, of a head-end node protection scheme is described in commonly-owned copending U.S. patent application Ser. No. 11/334,151, entitled PROTECTION AGAINST FAILURE OF A HEAD-END NODE OF ONE OR MORE TE-LSPS, filed by Vasseur on Jan. 18, 2006, the contents of which are hereby incorporated in its entirety. For instance, a prior-hop node to the head-end node, or an "up-stream neighboring node," creates tunnels to a "next-next-hop" node from the prior-hop node (i.e., a "downstream neighboring node" of the head-end node) along the TE-LSP. In this manner, should the head-end node fail, techniques are described to allow the prior-hop node to perform FRR around the failed head-end node directly to the next-next-hop node.

Another example of head-end node protection utilizes a plurality of redundant head-end nodes. For instance, an ATM (Asynchronous Transfer Mode) switch or a media gateway (e.g., Voice over IP, "VoIP," Video on Demand, "VoD," etc.) may often be redundantly connected to PE routers of a provider network. (Notably, as will be understood by those skilled in the art, the ATM switch may be connected as a "pseudowire" arrangement, where ATM frames are encapsulated as MPLS IP packets to traverse an MPLS provider core network.) Each PE router may be the head-end of a separate (and redundant) TE-LSP to a particular destination. In the event of a failure of a first (primary) head-end node of a primary tunnel (TE-LSP), the ATM switch or media gateway (the prior-hop node) redirects traffic to a second (secondary) redundant head-end node of a second TE-LSP accordingly. This solution works particularly well where TE-LSPs are already deployed in the network (e.g., a full or partial mesh), such that the primary and secondary TE-LSPs already exist within the network. Specifically, the primary and secondary TE-LSPs already reserve an amount of bandwidth (BW) required for the traffic and the redirected traffic. Without a pre-deployed TE-LSP arrangement, then, the secondary TE-LSP reserves an amount of BW that would accommodate the primary TE-LSP traffic, even though the traffic is not yet utilizing the secondary TE-LSP. This "double booking" of resources may be considered to be wasteful by network administrators, and thus should be avoided. Notably, network administrators may recognize that "1 for 1" redundancy attributed to "double booking" (one backup/secondary for each primary) is more expensive than "N for 1" redundancy (one backup/secondary for multiply primaries) that is typically provided by packet switched networks.

An alternative to double-booking resources is to configure the secondary TE-LSP with zero BW (i.e., the secondary TE-LSP is signaled and has a state associated therewith, but reserves no BW resources). While a zero BW TE-LSP provides a redundant TE-LSP, it does not guarantee BW along the TE-LSP, and thus does not provide a particular benefit of a TE-LSP. One solution to this problem is to utilize an automatic BW adjustment/resizing technique, such as the "auto-bandwidth" or "auto-BW" technique. The auto-BW technique and dynamically sized TE-LSPs are described further in "Cisco MPLS AutoBandwidth Allocator for MPLS Traffic Engineering: A Unique New Feature of Cisco IOS Software," a White Paper published by Cisco Systems, Inc., 2001, the contents of which are hereby incorporated by reference in their entirety. Specifically, a TE-LSP (e.g., the redundant zero BW TE-LSP) may periodically adjust the amount of reserved traffic to accommodate the amount of traffic currently utilizing the TE-LSP, e.g., eventually resizing a zero-BW TE-LSP to the full amount of the original primary TE-LSP due to the redirected traffic. However, those skilled in the art will understand that the auto-BW technique may be inefficient and slow, due to the measurement of data, calculation of data, and gradual adjustments of the BW. In other words, while the secondary zero-BW TE-LSP may eventually reserve the amount of BW reserved for the primary TE-LSP, the reservation is not immediate (e.g., on the order of several minutes), possibly resulting in other problems, such as lost traffic, degraded quality of service, inability to locate sufficient BW capacity, etc., as will be understood by those skilled in the art.

In addition, there are many types of primary TE-LSP "failures" that may result in the primary TE-LSP remaining in tact. For example, a link failure between the prior-hop node and the primary head-end node may not cause the primary TE-LSP to be torn down. While the primary head-end node maintains the primary TE-LSP, the prior-hop node may direct traffic to the secondary head-end node's TE-LSP. The reserved resources of the primary TE-LSP are unutilized, wasteful, and may preclude the establishment of other TE-LSPs that share common resources between the primary head-end node and tail-end node.

There remains a need, therefore, for a system and method for protecting against a failure of a TE-LSP, including the head-end node of the TE-LSP, that does not require double-booking of network resources. In particular, a need remains to more rapidly adjust the reserved BW of a secondary TE-LSP to accommodate rapidly redirected traffic due to the failure.

SUMMARY OF THE INVENTION

The present invention is directed to a technique for dynamically activating a secondary Traffic Engineering Label Switched Path (TE-LSP) at a secondary head-end node upon failure of a primary TE-LSP in a computer network. According to the novel technique, a primary head-end node establishes the primary TE-LSP having a primary bandwidth (BW) amount to a primary tail-end node. Also, the secondary head-end node establishes the secondary TE-LSP having zero BW to a secondary tail-end node (e.g., the same as the primary tail-end node). The secondary head-end node monitors the state of the primary TE-LSP, and in response to a failure (e.g., or other state change) substantially immediately adjusts the BW of the secondary TE-LSP to the primary BW amount ("activating" the TE-LSP). A "prior-hop" node to the primary and secondary head-end nodes originally forwarding traffic to the primary head-end node may then begin forwarding traffic to the secondary head-end node, and thus onto the adjusted secondary TE-LSP.

In accordance with one aspect of the present invention, the primary head-end node (e.g., a provider edge node, "PE") establishes the primary TE-LSP to the tail-end node (e.g., a remote PE). The primary head-end node may then notify the secondary head-end node (e.g., a redundant PE), e.g., selected based on one or more criteria, to create the secondary TE-LSP. For instance, the notification may be, e.g., a targeted notification or a flooded notification, indicating the selected secondary head-end node. Within the notification, the primary head-end node may specify the desired characteristics of the secondary TE-LSP, e.g., to match those of the primary TE-LSP (such as by including a Path Request message corresponding to the primary TE-LSP). Also, the primary head-end node may specify one or more requested triggers for which the secondary head-end is node is requested to monitor. Alternatively to the notifications, the secondary head-end node may be manually configured as such. In response to the notifications (or manual configuration), the secondary head-end node establishes the corresponding secondary TE-LSP (a "cold standby," or CS TE-LSP), but with zero BW.

In accordance with another aspect of the present invention, the secondary head-end node monitors the state of the primary TE-LSP, using a known connectivity verification protocol, such as, e.g., an Interior Gateway Protocol (IGP) or Bidirectional Forwarding Detection (BFD), etc., to detect the one or more requested triggers. The requested triggers (or, notably, other configured triggers) may comprise, e.g., head-end node failure, intermediate node failure, explicit notifications (e.g., due to failure of a connection between the prior-hop node and the primary head-end node, not generally detected by secondary head-end node), primary head-end node state changes (e.g., memory and/or processor consumption), etc. Notably, the explicit notification may be from the primary head-end node, and may be embodied as an IGP message or as extensions to a connectivity verification protocol (e.g., BFD), etc.

In accordance with yet another aspect of the present invention, upon detecting a trigger (e.g., a failure), the secondary head-end node substantially immediately adjusts the BW of the secondary TE-LSP to the primary BW amount in anticipation of redirected traffic from the prior-hop node, i.e., due to the (possible) failure of the primary TE-LSP. The prior-hop node detects the failure, e.g., through connectivity protocols or through direct notification from the primary (or secondary) head-end node, and redirects traffic to the secondary head-end node accordingly (e.g., a redundant head-end node). Upon determining successful adjustment and redirection, the primary head-end node may then tear down the primary TE-LSP (if not already torn down due to failure).

Advantageously, the novel technique dynamically activates a secondary TE-LSP at a secondary head-end node upon failure of a primary TE-LSP in a computer network. By adjusting BW of the secondary TE-LSP in response to failure of the primary TE-LSP, the novel technique prevents wasting (double-booking) of BW within the network, and allows for minimal delays associated with reserving the desired (primary's) BW amount (e.g., which is faster than auto-BW techniques). In particular, the present invention quickly adjusts the BW of the secondary TE-LSP in anticipation of forwarded traffic from a prior-hop node, such as, e.g., a redundantly connected switch or gateway server, due to a pre-detected cause for redirection (e.g., failures of the primary TE-LSP, etc.). Also, the present invention allows the secondary head-end node to predetermine whether it will be able to activate the secondary TE-LSP, thus allowing for an alternate secondary head-end node (and/or secondary TE-LSP) to be selected. Further, the dynamic aspects of the novel technique alleviate the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
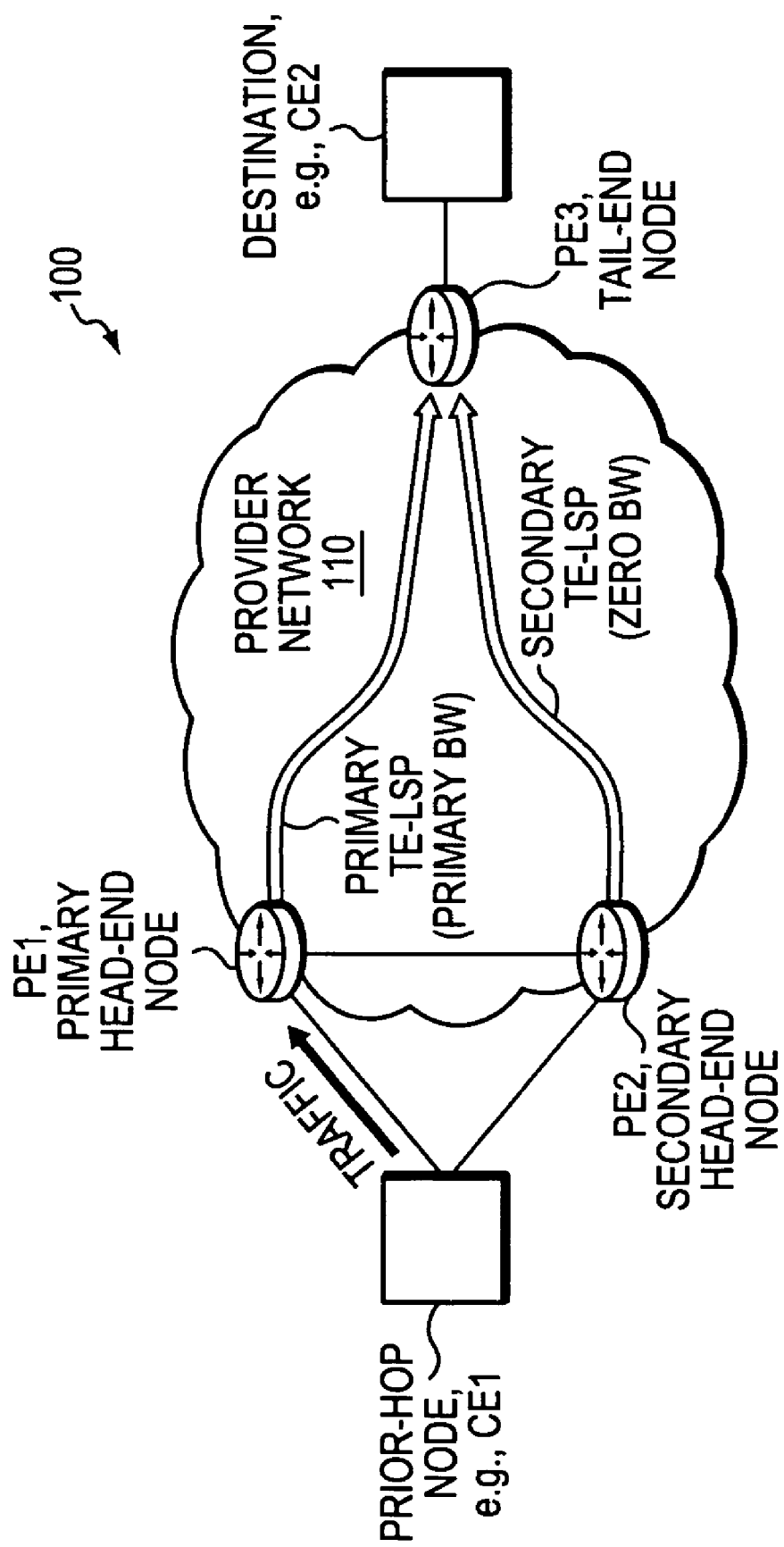
FIG. 1 is a schematic block diagram of an exemplary computer network that may be used in accordance with the present invention.

FIG. 1 is a schematic block diagram of an exemplary computer network 100 illustratively comprising edge devices (provider edge routers) PE1 and PE2 interconnected to PE3 by a provider (core) network 110 (e.g., having one or more links and provider routers, not shown). PE routers PE1 and PE2 may be configured as redundant connections to the provider network 110 for a "prior-hop" node to the PE routers (i.e., one hop prior to the PE routers), such as a customer network edge device (CE1). Example prior-hop routers may include, e.g., Asynchronous Transfer Mode (ATM) switches, media gateways (e.g., for Voice over IP, "VoIP," Video on Demand, "VoD," etc.), etc. PE3 may be interconnected to one or more nodes, e.g., destination nodes, such as a CE device CE2. Those skilled in the art will understand that any number of routers and nodes may be used in the computer network, and that the view shown herein is for simplicity. Those skilled in the art will also understand that while the present invention is described in terms of a provider core network with PE routers, any network configuration and any arrangement of nodes and/or routers may be used in accordance with the present invention. In particular, while the present invention describes a "prior-hop" node being the immediate hop prior, the present invention is equally applicable to network configurations where multiple hops exist between the prior-hop node and the PE routers (head-end nodes, as described below). Further, while PE3 is illustratively shown as a single node interconnected to the destination node CE3, multiple nodes (e.g., tail-end nodes) may connect the provider network 110 to the destination node, also as described below.

Data packets may be exchanged among the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
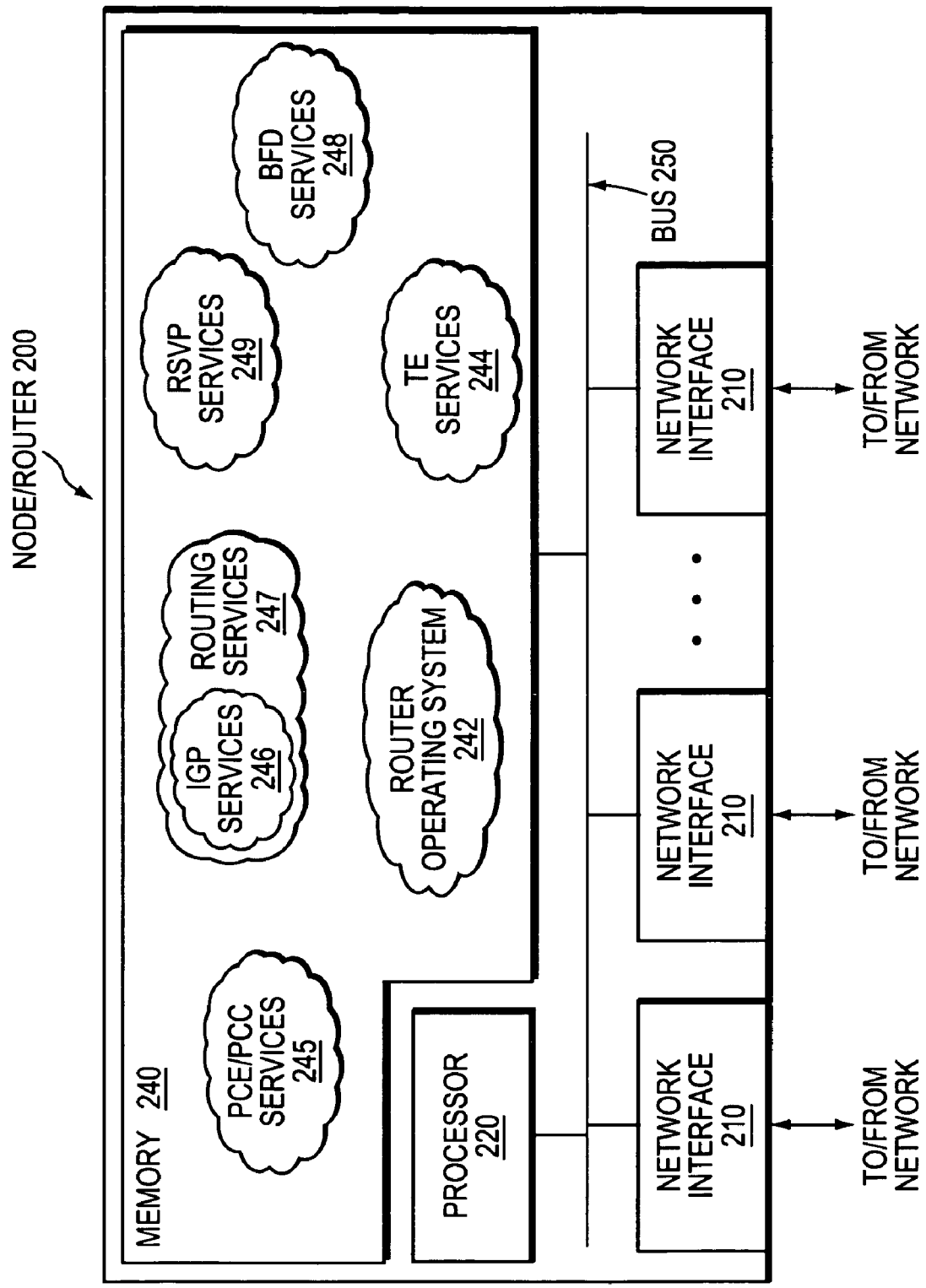
FIG. 2 is schematic block diagram of an exemplary router/node that may be advantageously used with the present invention.

FIG. 2 is a schematic block diagram of an exemplary node/router 200 that may be advantageously used with the present invention, e.g., as a head-end node. The node comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router. These software processes and/or services may comprise routing services 247, Interior Gateway Protocol (IGP) services 246, Bidirectional Forwarding Detection (BFD) services 248, Resource ReSerVation Protocol (RSVP) services 249, Path Computation Element/Client (PCE/PCC) services 245, and Traffic Engineering (TE) services 244. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP as IGP services 246 (e.g., OSPF and IS-IS), BGP, etc. These functions may be configured to manage a forwarding information database (not shown) containing, e.g., data used to make forwarding decisions. In particular, changes in the network topology may be communicated among routers 200 using IGP services 246, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology. Notably, routing services 247 may also perform functions related to virtual routing protocols, such as maintaining VRF instances (not shown) as will be understood by those skilled in the art.

Because of the increasing need for faster network response time and convergence, administrators often require the ability of individual network devices to quickly detect failures. Bidirectional Forwarding Detection (BFD) provides rapid failure detection times between devices, while maintaining low overhead. For instance, BFD failure detection may be as fast as 50 milliseconds (ms), while other methods (e.g., IGP, BGP, etc.) may be comparatively slower. BFD verifies connectivity between two devices based on the rapid transmission of BFD control packets between the two devices (e.g., little to no BFD holdtime, as will be understood by those skilled in the art). Notably, BFD also provides a single, standardized method of link/device/protocol failure detection at any protocol layer and over any media. BFD is further described in Katz, et al. *Bidirectional Forwarding Detection*<draft-ietf-bfd-base-04.txt>, Internet Draft, October, 2005, the contents of which are hereby incorporated by reference as though fully set forth herein. Generally, BFD sessions may be established between network nodes (e.g., routers) in order to monitor connectivity of the nodes over a particular link between the nodes.

BFD services 248 contain computer executable instructions executed by processor 220 to verify connectivity between two systems/devices, depending on the transmission of BFD control packets ("BFD messages") between the two devices. Assume, for example, that router PE2 (a monitoring node) wishes to verify its connectivity to router PE1 (a monitored node) using BFD. PE2 may transmit a BFD message to PE1, and PE2 verifies connectivity based on a response/non-response from PE1, e.g., within a particular time period. If PE2 does not receive a response from PE1 within the time period, PE2 determines that the BFD session has failed or "timed out" (or is "down"), accordingly.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress, a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. An example TE-LSP is shown as the lines and arrows (primary TE-LSP) between a head-end node (PE1) and a tail-end node (PE3) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs, the path computation request (and response) between PCC and PCE (e.g., through PCE/PCC services 245) may be exchanged in accordance with a protocol specified in Vasseur, et al., *Path Computation Element (PCE) Communication Protocol (PCEP)—Version 1*—<draft-ietf-pce-pcep-01.txt>, Internet Draft, February 2006, the contents of which are hereby incorporated by reference in their entirety. It should be understood that the use of RSVP or PCEP serves only as an example, and that other communication protocols may be used in accordance with the present invention.

RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

In accordance with RSVP, to request a data flow (TE-LSP) between a sender (e.g., head-end node PE1) and a receiver (e.g., tail-end node PE3), the sender may send an RSVP path request (Path) message downstream to the receiver along a path (e.g., a unicast route) to identify the sender and indicate e.g., bandwidth needed to accommodate the data flow, along with other attributes of the TE-LSP. The Path message may contain various information about the data flow including, e.g., traffic characteristics of the data flow. Also in accordance with the RSVP, a receiver establishes the TE-LSP between the sender and receiver by responding to the sender's Path message with a reservation request (Resv) message. The reservation request message travels upstream hop-by-hop along the flow from the receiver to the sender. The reservation request message contains information that is used by intermediate nodes along the flow to reserve resources for the data flow between the sender and the receiver, to confirm the attributes of the TE-LSP, and provide a TE-LSP label. If an intermediate node in the path between the sender and receiver acquires a Path message or Resv message for a new or established reservation (TE-LSP) and encounters an error (e.g., insufficient resources, failed network element, etc.), the intermediate node generates and forwards a path or reservation error (PathErr or ResvErr, hereinafter Error) message to the sender or receiver, respectively.

It should be noted that in accordance with RSVP signaling, the state of the RSVP is refreshed on a timed interval, e.g., every thirty seconds, in which RSVP Path and Resv messages (state control blocks) are exchanged. This timed interval is configurable by a system administrator, and the state may be refreshed dynamically at an earlier time, e.g., for use as described herein. In the event a node along the RSVP path (e.g., a TE-LSP) does not receive a state control block in the timed interval, the state "times out," and the path is no longer maintained by that node. Those skilled in the art will understand that RSVP is merely an example, and that other tunneling protocols may be used in accordance with the present invention.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

TE services (or process) 244 contain computer executable instructions for operating TE functions in accordance with the present invention. Examples of Traffic Engineering are described in RFC 3209, RFC 3784, and RFC 3630 as incorporated above, and in RFC 3473, entitled *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE-Database (TED) (not shown), generally resident in memory 240 and maintained and managed by TE services 244, may be used to store TE information provided by the various protocols, such as IGP, RSVP, BGP, BFD, PCEP, etc., and may interoperate with the various protocols to perform one or more functions associated with the present invention described herein.

Figure 3:
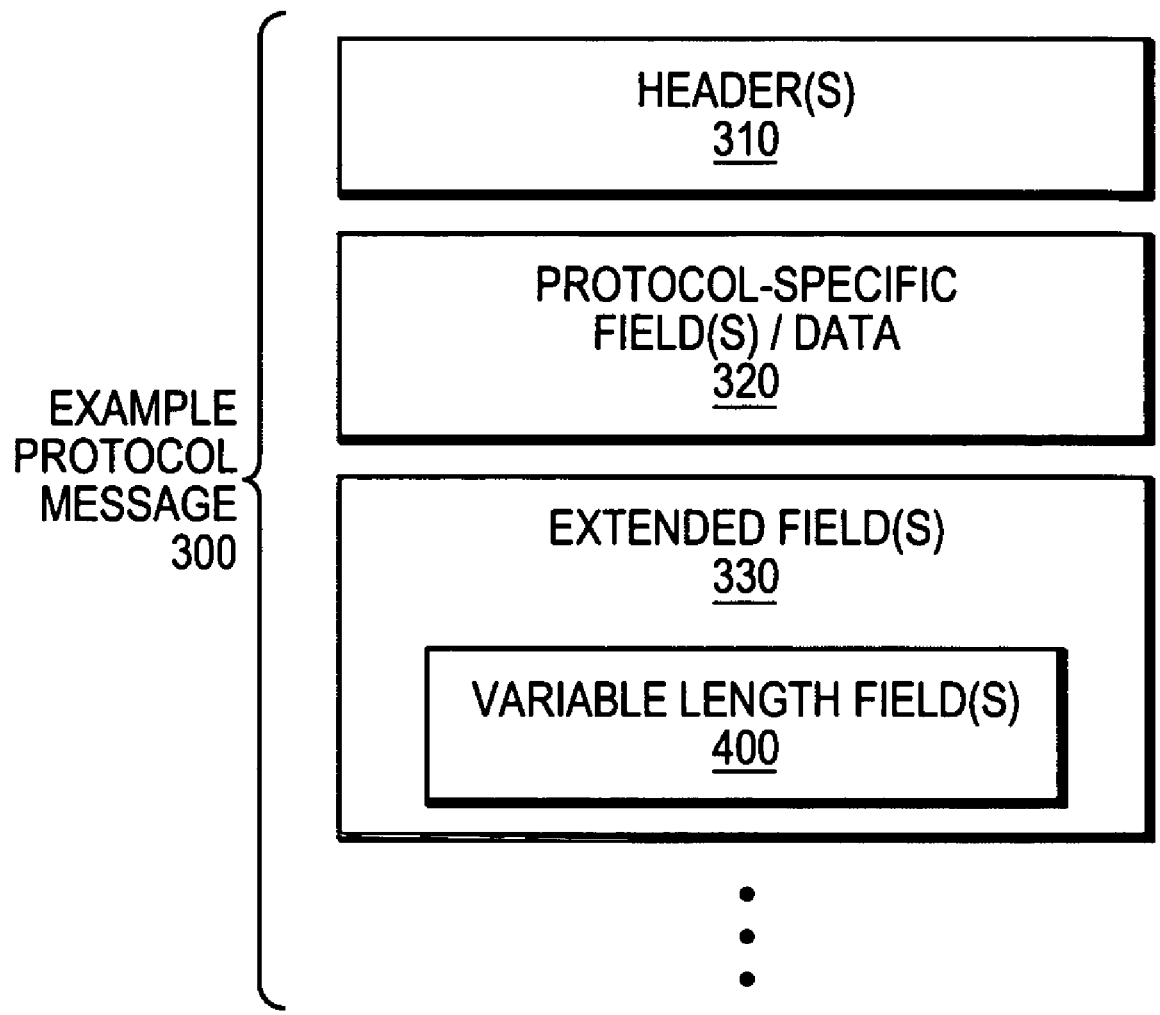
FIG. 3 is a schematic block diagram illustrating a generic protocol message that may be transmitted according to various protocols in accordance with the present invention.

FIG. 3 is a schematic block diagram illustrating a generic protocol message 300 that may be transmitted by nodes/routers 200 according to various protocols in accordance with the present invention, e.g., IGP, BFD, RSVP, PCEP, etc. Illustratively, the message 300 is shown as a high-level generic message, and those skilled in the art will understand that more specific messages may comprise other fields accordingly. The message 300 includes one or more headers 310, such as encapsulation protocol as well as one or more protocol-specific headers (e.g., BFD headers, RSVP headers, etc.). As those skilled in the art will understand, messages 300 are sent in an encapsulation appropriate to the environment (e.g., TCP/IP, ATM, MPLS, etc.). Thus, the encapsulation protocol header of headers 310 contains information standard for the specific type of encapsulation. Protocol-specific fields/data 320 may be used to contain protocol-specific information, as will be understood by those skilled in the art. For example, IGP messages may contain routing information of one or more address prefixes, while BFD messages may contain discriminator values to determine the appropriate BFD session. Also, RSVP messages may embody Path requests, Reservation requests, etc., within the protocol-specific fields 320, and PCEP messages may communicate PCEP-specific information between PCEs and PCCs, accordingly. Regardless of protocol, the extended field(s) section 330 (e.g., an extension to protocol-specific fields) may include one or more variable length fields 400, each having a specific type (or code), length, and value (TLV) to be used as described further herein.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
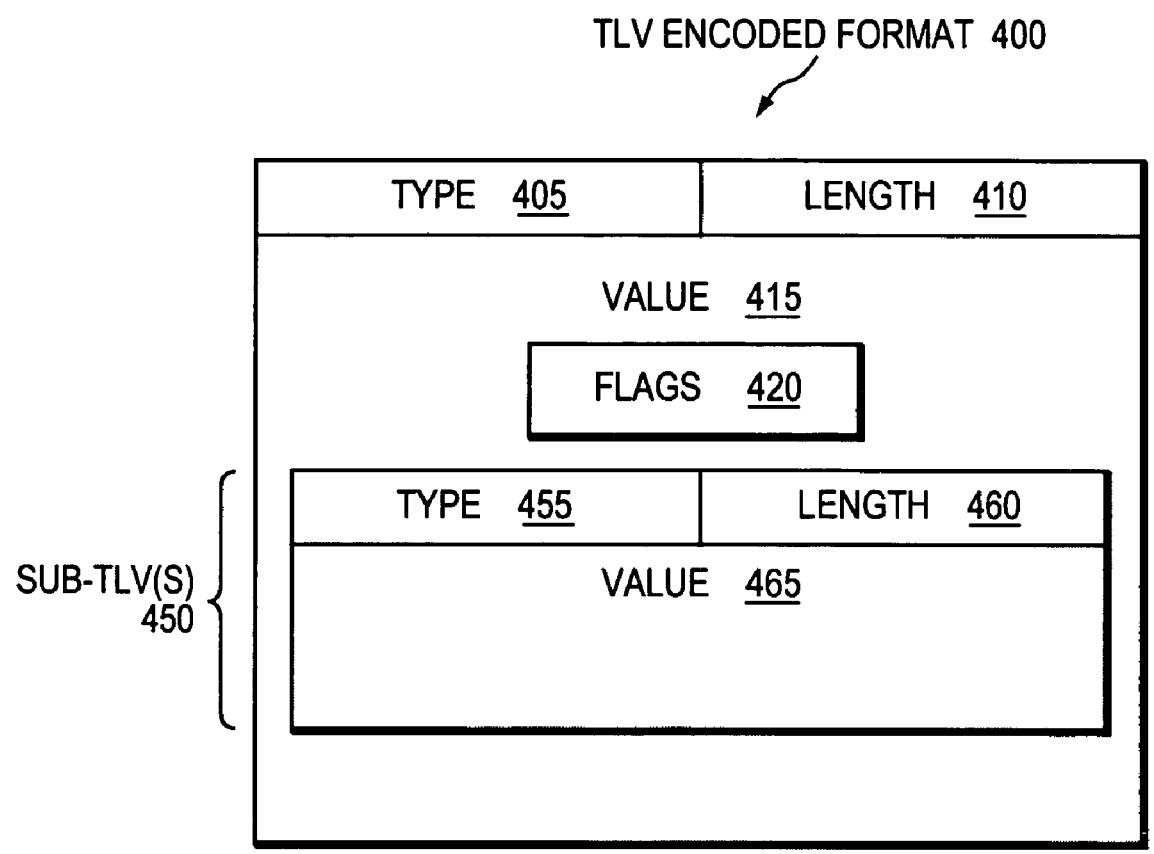
FIG. 4 is a schematic block diagram illustrating the TLV encoded format that may be advantageously used with the present invention.

FIG. 4 is a schematic block diagram illustrating the TLV encoded format 400 that may be advantageously used with the present invention. The TLV 400 may be used for a variable length field contained in an IGP Advertisement, BFD message, RSVP message, PCEP message, or other protocol messages in accordance with the present invention. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the present invention.

The present invention is directed to a technique for dynamically activating a secondary TE-LSP at a secondary head-end node upon failure of a primary TE-LSP in a computer network. According to the novel technique, a primary head-end node establishes the primary TE-LSP having a primary bandwidth (BW) amount to a primary tail-end node. Also, the secondary head-end node establishes the secondary TE-LSP having zero BW to a secondary tail-end node (e.g., either the same tail-end node as the primary tail-end node or a separate tail-end node, not shown). The secondary head-end node monitors the state of the primary TE-LSP, and in response to a failure (e.g., or other state change) substantially immediately adjusts the BW of the secondary TE-LSP to the primary BW amount ("activating" the TE-LSP). A "prior-hop" node to the primary and secondary head-end nodes originally forwarding traffic to the primary head-end node may then begin forwarding traffic to the secondary head-end node, and thus onto the adjusted secondary TE-LSP.

In accordance with one aspect of the present invention, the primary head-end node (e.g., a PE router/node, or simply a "PE") PE1 establishes the primary TE-LSP to the tail-end node (e.g., a remote PE) PE3. For instance, the primary TE-LSP may be established in response to a request from the prior-hop node CE1, or during initial network configuration, e.g., due to full- or partial-mesh networks, etc., as will be understood by those skilled in the art. The primary head-end node may then notify the secondary head-end node (e.g., a redundant PE) PE2 to create the secondary TE-LSP. The secondary head-end node PE2 may be selected based on one or more criteria for selection. For instance, the secondary head-end node may be statically configured, such as based on pre-established redundant connections, or dynamically determined. Dynamically determining redundant connections may be possible through a dynamic notification, e.g., from the prior-hop node, or by performing one or more routing lookup operations to determine a "next-best" next-hop node for the prior-hop node to the destination. A next-best next-hop node may be useful due to the assumption that in the event of a failure of the primary head-end node (presumable the best next-hop node for the prior-hop node), the prior-hop node will select the next-best next-hop node to the destination to continue to forward traffic, as will be understood by those skilled in the art.

The notification from the primary head-end node PE1 to the secondary head-end node PE2 may be, e.g., a targeted notification or a flooded notification, e.g., message 300. For example, a targeted notification is one in which the message 300 is sent specifically to the secondary head-end node, i.e., the secondary head-end node is the destination of the message. An example communication protocol that may be used to relay the targeted notification is PCEP (e.g., with extended object 400) described above. Also, in the event a BFD session is already established between the primary and secondary head-end nodes, a BFD embodied message 300 may utilize the extended object 400 to relay the notification. A flooded notification, on the other hand, may be embodied as an IGP message 300 (e.g., of local scope) with one or more extended objects 400. For instance, an OSPF router information link-state advertisement or an IS-IS link-state packet may have an extended object 400 that relays the notification to each node of the network. Notably, a flooded notification should specifically indicate the selected secondary head-end node (PE2), since other routers/nodes may receive the notification through the flooding process, as will be understood by those skilled in the art.

Within the notification (e.g., message 300), the primary head-end node PE1 may specify the desired characteristics of the secondary TE-LSP. For example, the primary head-end node may request that the characteristics of the secondary TE-LSP match those of the primary TE-LSP, such as, e.g., a primary BW (i.e., when activated), path boundaries (maximum costs, maximum delays, maximum link utilization, etc.), or other attributes/constraints that may be understood by those skilled in the art. Illustratively, the primary head-end node may include within the message 300 (e.g., in extended object 400) a Path Request message originally used to establish the primary TE-LSP to relay matching characteristics, since the original Path Request message may include such characteristics.

In addition, the primary head-end node PE1 may specify one or more requested triggers within the notification message 300 for which the secondary head-end node PE2 is requested to monitor. For instance, extended object 400 may contain one or more triggers (e.g., in sub-TLVs 450) specifying conditions under which the secondary TE-LSP should be activated, e.g., conditions indicating when the secondary head-end node may expect to begin receiving redirected traffic from the prior-hop node based on an inability of the primary TE-LSP to handle the traffic (e.g., due to failure). Various triggers to be contained within the message 300 to determine that the primary TE-LSP may be unavailable (e.g., has failed) are discussed in more detail below.

Notably, as an alternative to dynamically sending notifications from the primary head-end node PE1 to the secondary head-end node PE2, the secondary head-end node may be manually configured to establish the secondary TE-LSP, and to monitor for certain triggers accordingly. For example, a system administrator may pre-configure the network to provide one or more redundant connections to a prior-hop node CE1. As such, the system administrator may wish to pre-configure both the primary head-end node as well as the secondary head-end node with respective TE-LSPs, and may initiate the monitoring of the primary TE-LSP state based on one or more configured triggers. Also, the manual configuration of the secondary head-end node PE2 may only be partial, such that various features are dynamically configured (e.g., certain requested triggers), while other features are statically configured (e.g., certain configured triggers).

In response to the notifications (or manual configuration), the secondary head-end node PE2 establishes the corresponding secondary TE-LSP (a "cold standby," or CS TE-LSP), but with zero BW. As mentioned above, the zero BW TE-LSP prevents double-booking of resources within the network. Advantageously, by establishing the secondary TE-LSP (e.g., even with zero BW), much of the processing, signaling, etc., involved with establishing the TE-LSP (as will be understood by those skilled in the art) is completed in advance of the actual use of the TE-LSP. This reduces the time required to fully activate the secondary TE-LSP when required (described below). Notably, the secondary head-end node first determines whether there is sufficient BW to the destination to match the primary BW (or other requested BW), i.e., because as described herein, the secondary TE-LSP will need to be adjusted (resized) to the primary BW once activated. Notably, such determination (path computation) may be triggered repeatedly upon the expiration of a configurable timer at the secondary head-end node. In the event the secondary head-end node is not able to establish a secondary TE-LSP, e.g., due to lack of BW or other reasons (e.g., no actual path to destination, insufficient resources at the secondary head-end node, etc.), the secondary head-end node may notify the primary head-end node accordingly. In response, the primary head-end node may select another secondary head-end node (not shown), if available, and attempt to have another secondary TE-LSP established. If no other head-end nodes are available, the primary head-end node may send an alarm/error message to the prior-hop node CE1.

In accordance with another aspect of the present invention, the secondary head-end node PE2 monitors the state of the primary TE-LSP, using a known connectivity verification protocol, such as, e.g., an IGP or BFD, etc., to detect the one or more requested triggers. The requested triggers (or, notably, other configured triggers) may comprise, e.g., head-end node failure, intermediate node failure, explicit notifications, primary head-end node state changes, etc. For instance, to monitor for head-end node PE1 failure or intermediate node failure (i.e., nodes along the primary TE-LSP, not shown), the secondary head-end node PE2 may establish one or more BFD sessions to the particular monitored nodes, or may monitor for updated IGP messages, both of which are capable of indicating that the particular node is no longer available (i.e., a detected trigger).

Notably, the explicit notification may be from the primary head-end node PE1 (or the prior-hop node, CE1), and may be embodied as an IGP message or as extensions to a connectivity verification protocol (e.g., BFD), etc., such as in message 300. Explicit notifications may be created for any configurable reasons, such as known errors, scheduled maintenance, etc., that may not be generally detectable by the secondary head-end node PE2. For example, an explicit notification may be sent from the primary head-end node PE1 (or prior-hop node CE1) to the secondary head-end node PE2 in response to a failure of a connection between the prior-hop node and the primary head-end node, which is otherwise not generally detected by secondary head-end node.

Also, while not necessarily an explicit notification of a trigger, primary head-end node states may be communicated with the secondary head-end node through notification messages (e.g., message 300), such as by including state information within an extended TLV object 400 of a particular protocol message exchanged between the head-end nodes (e.g., BFD messages). For example, primary head-end node states may comprise, inter alia, memory consumption, processor consumption, buffer queue, or other status applicable to detecting an imminent failure of the primary TE-LSP or primary head-end node. The secondary head-end node PE2 may be instructed to monitor for certain thresholds or rates of changes to the states to determine that a trigger has been detected. Alternatively, the state changes may be embodied as one or more explicit notifications from the primary head-end node, indicating to the secondary head-end node that a trigger has occurred at the primary head-end node, without having to disclose the particular state change (e.g., the amount of memory/processor consumption, etc.).

As mentioned above, certain triggers may be dynamically requested, while others may be statically configured. For example, the primary head-end node may request that the secondary head-end node monitor for failure of an intermediate node. The secondary head-end node (if able to comply) may then monitor the intermediate nodes accordingly. Further, however, the secondary head-end node may be configured to monitor whether the primary head-end node has failed. The secondary head-end node, without being requested to do so by the primary head-end node, may also monitor the state of the primary head-end node, e.g., based on exchanged BFD messages 300.

Notably, triggers are not limited to single events, but may comprise one or more combined triggers accordingly. For example, it may be determined sets of events may be required before the primary TE-LSP will ultimately fail. Assume, for instance, that the primary head-end node PE1 is redundantly connected to two or more internal provider (P) devices within the provider network 110. The requested trigger set, therefore, may reflect the redundancy by requiring that the secondary head-end node PE2 detect failure of each of the redundant P devices prior to determining that the primary TE-LSP has failed. This alleviates the need for the secondary head-end node to self-compute whether the primary head-end node has alternate paths to reroute the primary TE-LSP, i.e., by having the primary head-end node specifically instruct the secondary head-end node of its multiple available paths. Other combined triggers may be defined in accordance with the present invention, e.g., redundant CE device failures, redundant connection failures, multiple state changes, etc., as will be understood by those skilled in the art, and those combined triggers mentioned herein are merely representative examples.

In addition to monitoring the primary head-end node PE1, the secondary head-end node PE2 may also be configured to (or requested to) monitor the state of itself and/or the secondary TE-LSP. For instance, in the event other factors present at the secondary head-end node would prevent or inhibit the secondary head-end node's capability to act as a redundant backup node (e.g., memory/processor consumption, scheduled maintenance, etc.), the secondary head-end node may notify the primary head-end node of its state accordingly. This way, the primary head-end node may respond by requesting the establishment of a separate secondary TE-LSP from a different available redundant head-end node (not shown). Also, the availability of the secondary TE-LSP may be monitored to determine whether it remains available for use. For instance, if intermediate nodes of the secondary TE-LSP fail, or if BW is consumed by other resources along the secondary TE-LSP (e.g., determined by periodically performing constrained shortest path first, CSPF operations), the secondary head-end node may inform the primary head-end node of the inability to activate the secondary TE-LSP (if necessary), again so the primary head-end node may attempt to establish another secondary TE-LSP at a different head-end node (or, notably, send an alarm/error message to the prior-hop node).

Figure 5:
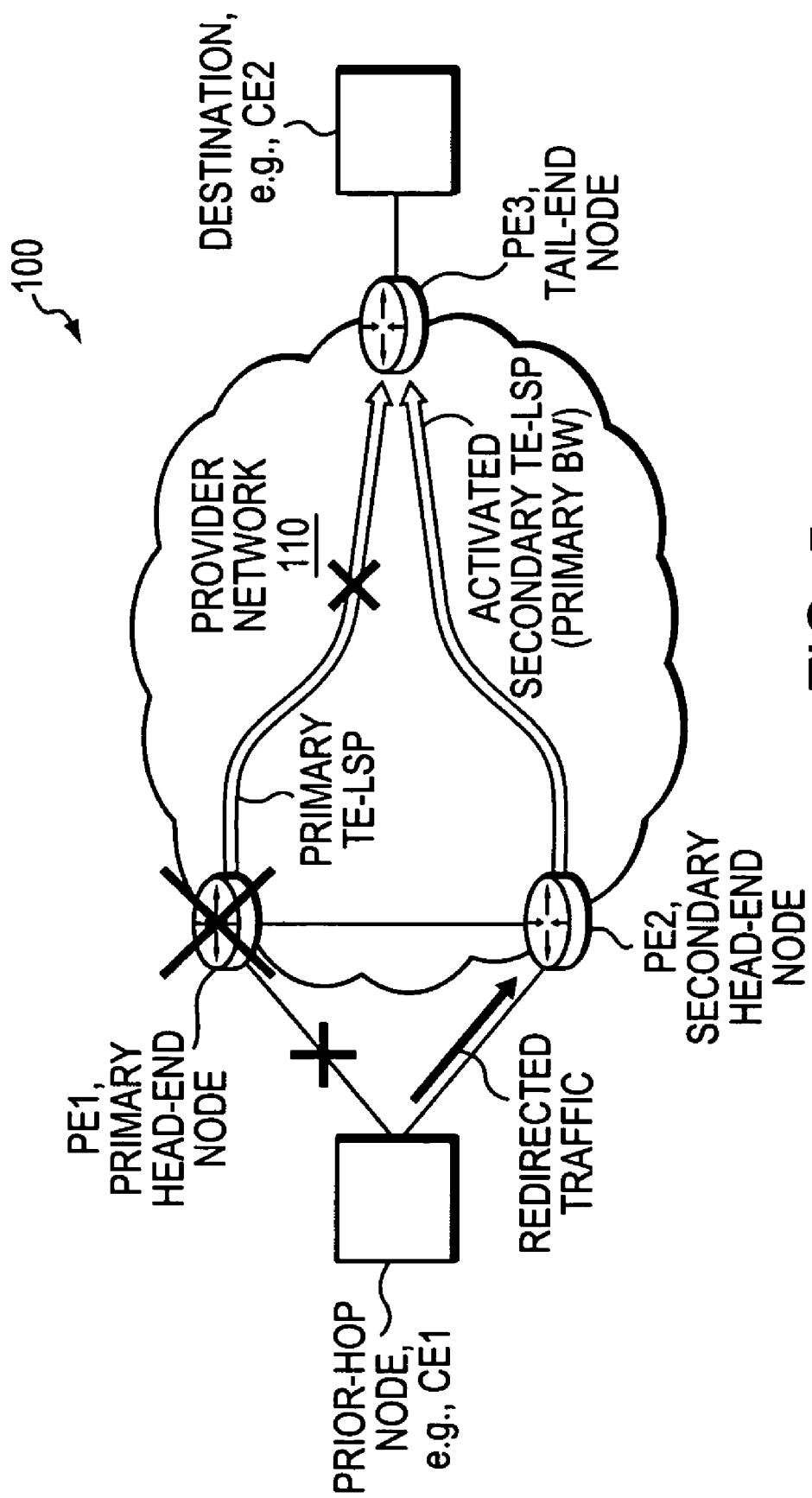
FIG. 5 is a schematic block diagram of the computer network in FIG. 1 depicting activation of a secondary TE-LSP in accordance with the present invention.

In accordance with yet another aspect of the present invention, upon detecting a trigger (e.g., a failure), the secondary head-end node PE2 substantially immediately adjusts the BW of the secondary TE-LSP to the primary BW amount (activating the secondary TE-LSP) in anticipation of redirected traffic from the prior-hop node CE1, i.e., due to the (possible) failure of the primary TE-LSP. FIG. 5 is a schematic block diagram of the computer network 100 in FIG. 1 depicting activation of a secondary TE-LSP in accordance with the present invention. Illustratively, a trigger may have occurred at an intermediate node, the primary head-end node PE1, or the link between the primary head-end node and the prior-hop node CE1, each possible trigger indicated by an overlaid "X." The secondary head-end node detects the trigger, and adjusts the BW (i.e., the reserved BW) of the secondary TE-LSP to the primary BW value. Notably, the secondary head-end node may determine a maximum available BW amount along the secondary TE-LSP as mentioned above (e.g., CSPF state monitoring). In the event the maximum available BW is less than the primary BW, the secondary head-end node may adjust the secondary TE-LSP to the maximum available BW instead (i.e., adjusting to the lesser of the maximum available BW and the primary BW). In such an event, the secondary head-end node may notify the primary head-end node (or prior-hop node) of the lesser reservation/adjustment accordingly (e.g., to initiate alarms, log entries, reattempts to establish the primary TE-LSP, attempts to establish further secondary TE-LSPs, etc.).

It is important to note that in the event of an intermediate node (of the primary TE-LSP) failure, the primary head-end node may actually be able to redirect the primary TE-LSP without any substantial disruption of service (e.g., using Fast Reroute, FRR techniques, as will be understood by those skilled in the art). Accordingly, the head-end node of the present invention may be configured to react to an intermediate node failure that may not cause a failure of the primary TE-LSP in a number of ways. For example, one possible configuration is to have the primary head-end node PE1 inform the secondary head-end node to re-adjust the BW of the secondary TE-LSP to zero, thus "deactivating" the secondary TE-LSP (to avoid wasted resources, etc.). A second example configuration, if explicit notification is unavailable, is to have the secondary head-end node run a CSPF algorithm rooted at the primary head-end node in order to determine whether the primary head-end node will be able to reroute the primary TE-LSP. If so, the secondary head-end node does not activate (or deactivates) the secondary TE-LSP. If not, however, the secondary TE-LSP is (or remains) activated accordingly. A third example solution is to have the primary head-end node PE1 tear down the primary (described below), thus forcing the utilization of the secondary TE-LSP, regardless of whether the primary head-end node could have "fixed" the failed intermediate node. Those skilled in the art will appreciate that this solution may be simpler (and faster) than performing the above-mentioned calculations and/or notifications, and thus may be beneficial to certain network configurations. Notably, the instructions for which proposed solution to configure the head-end nodes may be negotiated within the initially requested trigger criteria described above, or through additional communications between the head-end nodes PE1 and PE2.

The solutions proposed above, however, may be obviated through the use of combined triggers, as described herein. For example, as opposed to determining whether the primary head-end node may reroute (fix) a possibly failed primary TE-LSP (e.g., with FRR, etc.), the secondary head-end node may be configured to monitor for triggers that distinctly prohibit correction of the primary TE-LSP. For instance, if the primary head-end node has established redundant connections (e.g., for FRR), the primary head-end node may inform the secondary head-end node to monitor for a failure of each of the redundant connections. The secondary head-end node, then, may determine that activation of the secondary TE-LSP is necessary in response to failure of each redundant connection, and not just a single connection.

In accordance with the present invention, the prior-hop node (CE1) detects the failure, e.g., through connectivity protocols or through direct notification from the primary (or secondary) head-end node, and redirects traffic to the secondary head-end node accordingly (e.g., a redundant head-end node), shown as the redirected arrow in FIG. 5. For example, the primary or secondary head-end node (PE1 or PE2) may send a specific notification (e.g., message 300) to the prior-hop node indicating the failure of the primary TE-LSP, such as an alarm indication signal (AIS) to an ATM switch. Other means for indicating a failure of the primary TE-LSP are also available, such as, e.g., shutting down the link between the prior-hop node and the primary head-end node, such that the prior-hop node (e.g., through connectivity protocols) will determine that the primary head-end node (i.e., the primary TE-LSP) is no longer available, and will begin to forward traffic to the redundant head-end node accordingly. In the event the secondary head-end node is not pre-configured at the prior-hop node as a redundant node, the prior-hop node selects a next-best next-hop to the desired destination (e.g., CE2), which should be the same as the secondary head-end node as determined initially by the primary (and/or secondary) head-end node to be the next-best next-hop to the destination as described above.

Upon determining successful adjustment and redirection, the primary head-end node PE1 may then tear down the primary TE-LSP (if not already torn down due to failure). In particular, the secondary head-end node PE2 may notify the primary head-end node of the successful adjustment (activation) of the secondary TE-LSP, such as through messages 300, described above. Also, successful redirection may be determined, at least inherently, by no longer receiving the originally forwarded traffic from the prior-hop node CE1, e.g., due to a down link or an explicit notification to cease, as mentioned above. Tearing down the primary TE-LSP reduces the amount of necessary allocated resources in the network, thus preventing double booking due to the activation of the secondary TE-LSP. Notably, in the event the adjustment is not a success, the primary (or secondary, depending upon configuration) head-end node may be configured to inform the prior-hop node of the failure to adjust (activate) the secondary TE-LSP, e.g., using one or more alarms or other explicit notifications, as will be understood by those skilled in the art.

Figure 6:
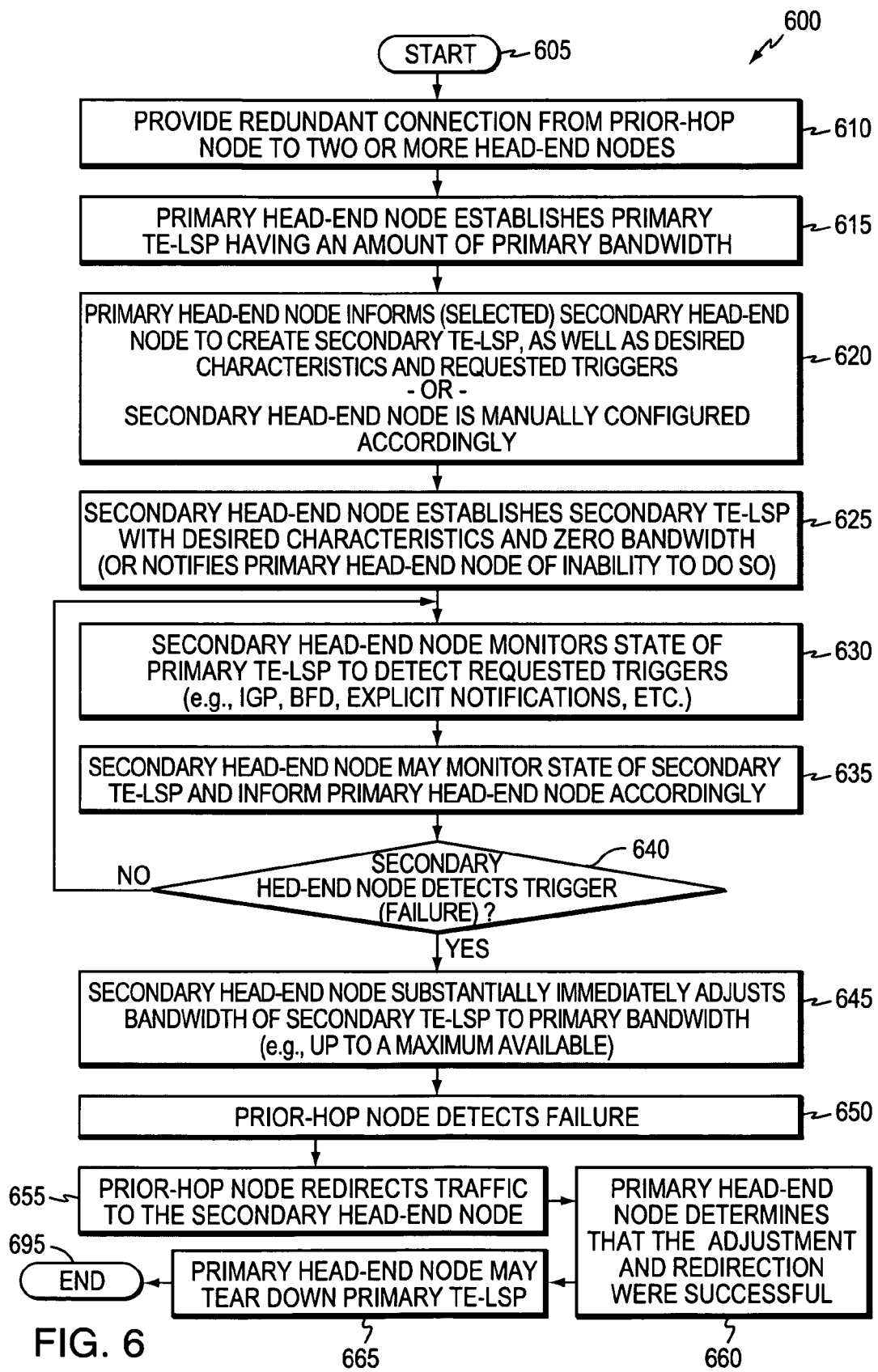
FIG. 6 is a flowchart illustrating a procedure for dynamically activating a secondary TE-LSP in accordance with the present invention.

FIG. 6 is a flowchart illustrating a procedure for dynamically activating a secondary TE-LSP in accordance with the present invention. The procedure 600 starts at step 605, and continues to step 610, where a redundant connection is provided from a prior-hop node (e.g., CE1) to two or more head-end nodes (e.g., PE1 and PE2). A primary head-end node (e.g., PE1) establishes a primary TE-LSP to a tail-end node (e.g., PE3) in step 615, the primary TE-LSP having a primary BW associated therewith. In step 620, the primary head-end node informs a selected secondary head-end node (e.g., PE2) to create a secondary TE-LSP toward a destination (e.g., to tail-end node PE3). As described above, the primary head-end node may inform the secondary head-end node through IGP messages, BFD messages, etc. (300), and may include one or more characteristics of the primary TE-LSP (e.g., using an RSVP Path message 300) and one or more requested triggers. Alternatively in step 620, the secondary head-end node may be manually configured according to the primary TE-LSP and requested triggers, as mentioned above.

At step 625, the secondary head-end node establishes the secondary TE-LSP with the desired characteristics of the primary TE-LSP, but with zero BW. (In the event the secondary head-end node is unable to establish the secondary TE-LSP, the secondary head-end node may notify the primary head-end node, as described above.) At step 630, the secondary head-end node monitors the state of the primary TE-LSP to detect the requested triggers. For instance, in addition to IGP updates, the secondary head-end node may establish one or more dynamic BFD sessions with the primary head-end node and/or with intermediate nodes along the primary TE-LSP, or may await an explicit notification (e.g., from the primary head-end node), such as for when the link between the prior-hop node (CE1) and primary head-end node (PE1) fails. Notably, the secondary head-end node may also monitor the state of the secondary TE-LSP in step 635, and may inform the primary head-end node of any state changes (e.g., inability to adjust/resize) accordingly.

At step 640, the secondary head-end node continues to monitor states in steps 630 and 635 until detecting a trigger (e.g., failure, explicit notification, etc.). In response to a detected trigger, the secondary head-end node substantially immediately adjusts the BW of the secondary TE-LSP to the primary BW in step 645. By doing so, the secondary head-end node prepares for any anticipated traffic that may be redirected thereto from the prior-hop node as a result of the primary TE-LSP failure. As mentioned above, a detected trigger may be applied to one or more policies to determine whether adjustment/resizing of the secondary TE-LSP is necessary, such as where the primary may be quickly corrected, etc. Also as mentioned above, based on one or more computations (e.g., CSPF), the adjustment may be made up to a maximum available amount of BW (which, if less than the primary BW, may cause the secondary head-end node to notify the primary head-end node as described herein).

In step 650, the prior-hop node CE1 detects the failure, e.g., by determining that the primary head-end node is no longer available, and responds in step 655 by redirecting traffic originally destined for the primary head-end node PE1 (thus, to the primary TE-LSP) to the secondary head-end node PE2 (thus, to the secondary TE-LSP). The primary head-end node may then determine in step 660 that the adjustment of the secondary TE-LSP and the redirection of traffic thereto was successful (as described above), and in step 665 may tear down the primary TE-LSP accordingly (if not already down due to failure). For instance, even though the primary TE-LSP may still be viable through the network, other "primary TE-LSP failures" (e.g., the link between CE1 and PE1 failing) may cause the activation of the secondary TE-LSP. Accordingly, the primary TE-LSP may be deallocated, e.g., to release resources in the network such that the secondary TE-LSP may use those resources without double-booking. The procedure ends in step 695.

Advantageously, the novel technique dynamically activates a secondary TE-LSP at a secondary head-end node upon failure of a primary TE-LSP in a computer network. By adjusting BW of the secondary TE-LSP in response to failure of the primary TE-LSP, the novel technique prevents wasting (double-booking) of BW within the network, and allows for minimal delays associated with reserving the desired (primary's) BW amount (e.g., which is faster than auto-BW techniques). In particular, the present invention quickly adjusts the BW of the secondary TE-LSP in anticipation of forwarded traffic from a prior-hop node, such as, e.g., a redundantly connected switch or gateway server, due to a pre-detected cause for redirection (e.g., failures of the primary TE-LSP, etc.). Also, the present invention allows the secondary head-end node to predetermine whether it will be able to activate the secondary TE-LSP, thus allowing for an alternate secondary head-end node (and/or secondary TE-LSP) to be selected. Further, the dynamic aspects of the novel technique alleviate the need for cumbersome manual configuration.

While there has been shown and described an illustrative embodiment that dynamically activates a secondary TE-LSP at a secondary head-end node upon failure of a primary TE-LSP in a computer network, it is to be understood that various other adaptations and modifications may be made within the spirit and scope of the present invention. For example, the invention has been shown and described herein using a core network architecture with CE and PE routers. However, the invention in its broader sense is not so limited, and may, in fact, be used with any redundant TE-LSPs and corresponding TE-LSP head-end nodes. Moreover, while the above description describes performing various techniques at primary and/or secondary head-end nodes, the invention may also be advantageously used with PCEs. In addition, while one example of a tunnel is an MPLS TE-LSP, other known tunneling methods include, inter alia, the Layer Two Tunnel Protocol (L2TP), the Point-to-Point Tunneling Protocol (PPTP), and IP tunnels, which may also be used in accordance with the present invention. Also, those skilled in the art will understand that the use of IGP (IS-IS, OSPF), RSVP, BFD, PCEP, etc., are representative examples, and that other means for performing elements of the present invention may be used accordingly.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for dynamically activating a secondary Traffic Engineering Label Switched Path (TE-LSP) at a secondary head-end node separate from a primary head-end node of a primary TE-LSP in a computer network, upon failure of the primary TE-LSP in the computer network, the method comprising:

establishing the primary TE-LSP to have a primary bandwidth (BW) amount for supporting traffic, the primary TE-LSP extending from the primary head-end node to a primary tail-end node;

receiving, by the secondary head-end node separate from the primary head-end node, a notification from the primary head-end node indicating characteristics of the primary TE-LSP, the characteristics including the primary BW amount;

in response to receiving the notification, establishing the secondary TE-LSP to have zero BW for supporting traffic, the secondary TE-LSP extending from the secondary head-end node separate from the primary head-end node to a secondary tail-end node;

monitoring, by the secondary head-end node, a state of the primary TE-LSP;

determining a failure of the primary TE-LSP;

in response to determining the failure of the primary TE-LSP, substantially immediately adjusting, by the secondary head-end node, the BW of the secondary TE-LSP to the primary BW amount indicated in the received notification in anticipation of traffic being redirected, and receiving redirected traffic at the secondary head-end node and passing the redirected traffic on the secondary TE-LSP whose BW has already been adjusted.

2. The method as in claim 1, further comprising:

forwarding the traffic to the primary head-end node from a prior-hop node of the primary and secondary head-end nodes; and in response to failure of the primary TE-LSP, forwarding the traffic from the prior-hop node to the secondary head-end node.

3. A non-transitory computer readable medium containing executable program instructions for dynamically activating a secondary Traffic Engineering Label Switched Path (TE-LSP) at a secondary head-end node separate from a primary head-end node of a primary TE-LSP in a computer network, upon failure of the primary TE-LSP originating from the primary head-end node in the computer network, the primary TE-LSP to have a primary bandwidth (BW) amount for supporting traffic, the executable program instructions comprising program instructions to:
 process a received notification from the primary head-end node indicating characteristics of the primary TE-LSP, the characteristics including the primary BW amount;
 in response to the received notification, establish the secondary TE-LSP to have zero BW for supporting traffic, the secondary TE-LSP extending from the secondary head end node separate from the primary head-end node to a secondary tail end node;
 monitor, at the secondary head-end node, a state of the primary TE-LSP;
 determine a failure of the primary TE-LSP;
 in response to determination of the failure of the primary TE-LSP, substantially immediately adjust, at the secondary head-end node, the BW of the secondary TE-LSP to the primary BW amount indicated in the notification in anticipation of traffic being redirected, and
 receive redirected traffic at the secondary head-end node and pass the redirected traffic on the secondary TE-LSP whose BW has already been adjusted.

4. An apparatus for dynamically activating a secondary Traffic Engineering Label Switched Path (TE-LSP) at a secondary head-end node separate from a primary head-end node of a primary TE-LSP in a computer network, upon failure of the primary TE-LSP originating from the primary head-end node in the computer network, the primary TE-LSP to have a primary bandwidth (BW) amount for supporting traffic, the apparatus comprising:
 means for receiving a notification from the primary head-end node indicating characteristics of the primary TE-LSP, the characteristics including the primary BW amount;
 means for establishing the secondary TE-LSP to have zero BW for supporting traffic in response to the received notification, the secondary TE-LSP extending from the secondary head-end node separate from the primary head-end node to a secondary tail-end node;
 means for monitoring, at the secondary head-end node, a state of the primary TE-LSP;
 means for determining a failure of the primary TE-LSP; and
 means for substantially immediately adjusting, at the secondary head-end node, the BW of the secondary TE-LSP to the primary BW amount indicated in the received notification in anticipation of traffic being redirected, to permit the secondary TE-LSP to be used in place of the primary TE-LSP for the traffic, in response to determination of a failure of the primary TE-LSP.

5. A system for dynamically activating a secondary Traffic Engineering Label Switched Path (TE-LSP), the system comprising:
 a primary head-end node configured to establish a primary TE-LSP for supporting traffic, the primary TE-LSP to have a primary bandwidth (BW) amount; and
 a secondary head-end node separate from the primary head-end node and configured to
  i) process a received notification from the primary head-end node indicating characteristics of the primary TE-LSP, the characteristics including the primary BW amount,
  ii) establish a secondary TE-LSP to have zero BW,
  iii) monitor a state of the primary TE-LSP,
  iv) determine a failure of the primary TE-LSP,
  v) in response to the failure of the primary TE-LSP, substantially immediately adjust the BW of the secondary TE-LSP to the primary BW amount indicated in the received notification in anticipation of traffic being redirected, and
  vi) pass received redirected traffic on the secondary TE-LSP whose BW has already been adjusted.

6. The system as in claim 5, further comprising:
 a prior-hop node of the primary and secondary head-end nodes, the prior-hop node configured to i) forward the traffic to the primary head-end node, and ii) in response to failure of the primary TE-LSP, forward the traffic to the secondary head-end node.

7. A secondary head-end node separate from a primary head-end node of a primary TE-LSP in a computer network, for dynamically activating a secondary Traffic Engineering Label Switched Path (TE-LSP) upon failure of the primary TE-LSP in the computer network, the primary TE-LSP to have a primary bandwidth (BW) amount for supporting traffic, the secondary head-end node comprising:
 one or more network interfaces;
 a processor coupled to the one or more network interfaces and adapted to execute software processes; and
 a memory adapted to store a TE process executable by the processor, the TE
 process configured to: i) process a received notification from the primary head-end node indicating characteristics of the primary TE-LSP, the characteristics including the primary BW amount, ii) establish the secondary TE-LSP to have zero BW, iii) monitor a state of the primary TE-LSP, iv) determine a failure of the primary TE-LSP, v) in response to the failure of the primary TE-LSP, substantially immediately adjust the BW of the secondary TE-LSP to the primary BW amount indicated in the received notification in anticipation of traffic being redirected, and vi) pass received redirected traffic on the secondary TE-LSP whose BW has already been adjusted.

8. The secondary head-end node as in claim 7, wherein the one or more network interfaces are configured to receive the traffic from a prior-hop node of the primary and secondary head-end nodes in response to failure of the primary TE-LSP.

9. The secondary head-end node as in claim 7, wherein the received notification is one of either a flooded notification or a targeted notification to the secondary head-end node.

10. The secondary head-end node as in claim 7, wherein the characteristics of the primary TE-LSP are indicated by a copy of a Path Request message used for the primary TE-LSP that is included in the received notification.

11. The secondary head-end node as in claim 7, wherein the TE process is configured to monitor the state of the primary TE-LSP by monitoring one or more requested triggers.

12. The secondary head-end node as in claim 11, wherein the one or more requested triggers are selected from a group comprising: primary head-end node failure, primary TE-LSP intermediate node failure, explicit notifications, and primary head-end node state changes.

13. The secondary head-end node as in claim 12, wherein the explicit notifications are received from the primary head-end node.

14. The secondary head-end node as in claim 11, wherein the primary head-end node state changes are selected from a group comprising: memory consumption and processor consumption.

15. The secondary head-end node as in claim 11, wherein the TE process is configured to determine a failure of the primary TE-LSP based on detecting one or more of the requested triggers.

16. The secondary head-end node as in claim 11, wherein the received notification includes an indication of the one or more requested triggers.

17. The secondary head-end node as in claim 11, wherein the one or more requested triggers comprise one or more combined triggers.

18. The secondary head-end node as in claim 7, wherein the TE process is configured manually to establish the secondary TE-LSP and to monitor the state of the primary TE-LSP.

19. The secondary head-end node as in claim 7, wherein the TE process is further configured to determine that the secondary head-end node is unable to establish the secondary TE-LSP, and in response, inform the primary head-end node of the inability.

20. The secondary head-end node as in claim 7, wherein the TE process is further configured to monitor a state of the established secondary TE-LSP, and to inform the primary head-end node of any configurable changes to the state of the secondary TE-LSP.

21. The secondary head-end node as in claim 7, wherein the TE process is further configured to determine a maximum available BW for the secondary TE-LSP, wherein the TE process is configured to adjust the BW of the secondary TE-LSP to a lesser BW of the maximum available BW and the primary BW.

22. The secondary head-end node as in claim 21, wherein the TE process is further configured to inform the primary head-end node that the maximum available BW is less than the primary BW.

23. The secondary head-end node as in claim 7, wherein the TE process is further configured to determine a maximum available BW for the secondary TE-LSP, wherein the TE process is configured to determine that the secondary TE-LSP cannot be established in the event the maximum available BW for the secondary TE-LSP is less than the primary BW.

24. The secondary head-end node as in claim 23, wherein the TE process is further configured to inform the primary head-end node of at least one of either the maximum available BW being less than the primary BW or that the secondary TE-LSP cannot be established.

25. The secondary head-end node as in claim 23, wherein the TE process is configured to determine that the secondary TE-LSP cannot be established prior to determination of a failure of the primary TE-LSP.

26. The secondary head-end node as in claim 7, wherein the TE process is further configured to determine whether the primary head-end node is able to redirect the primary TE-LSP after a failure, and if so, ceasing the adjustment of BW of the secondary TE-LSP.

27. A primary head-end node for use with dynamically activating a secondary Traffic Engineering Label Switched Path (TE-LSP) at a secondary head-end node separate from the primary head-end node, upon failure of a primary TE-LSP in a computer network, the primary head-end node comprising:
   one or more network interfaces configured to receive traffic from a prior-hop node of the primary head-end node and the secondary head-end node separate from the primary head-end node;
   a processor coupled to the one or more network interfaces and adapted to execute software processes; and
   a memory adapted to store a TE process executable by the processor, the TE process configured to: i) establish the primary TE-LSP to have a primary BW, ii) send a notification to the secondary TE-LSP indicating characteristics of the primary TE-LSP, the characteristics including the primary BW, iii) determine a failure of the primary TE-LSP, iv) determine that the received traffic has been redirected by the prior-hop node to the secondary head-end node, v) determine that the secondary head-end node has adjusted the secondary TE-LSP to the primary BW indicated in the received notification in anticipation of traffic being redirected, and vi) in response to determination of the failure, the redirection, and the adjustment, cease to use the primary TE-LSP for traffic and tear down the primary TE-LSP.

28. The primary head-end node as in claim 27, wherein the notification indicates one or more requested triggers for which the secondary head-end node is requested to monitor to determine a failure of the primary TE-LSP.

29. The primary head-end node as in claim 27, wherein the TE process is further configured to inform the prior-hop node of the primary TE-LSP failure.

30. The primary head-end node as in claim 29, wherein the TE process is configured to inform the prior-hop node of the primary TE-LSP failure by one of either an explicit notification message or by shutting down a link between the prior-hop node and the primary head-end node.

* * * * *